US008241172B2

(12) United States Patent
Lahtinen et al.

(10) Patent No.: US 8,241,172 B2
(45) Date of Patent: Aug. 14, 2012

(54) ARRANGEMENT IN A PLANETARY GEARING AND A PLANETARY GEAR

(75) Inventors: Petri Lahtinen, Muurame (FI); Ari Ryymin, Jyväskylä (FI)

(73) Assignee: Moventas Oy, Jyväskylä (FI)

( * ) Notice: Subject to any disclaimer, the term of this patent is extended or adjusted under 35 U.S.C. 154(b) by 234 days.

(21) Appl. No.: 12/811,647

(22) PCT Filed: Jan. 2, 2009

(86) PCT No.: PCT/FI2009/050001

§ 371 (c)(1), (2), (4) Date: Jul. 2, 2010

(87) PCT Pub. No.: WO2009/083657

PCT Pub. Date: Jul. 9, 2009

(65) Prior Publication Data

US 2010/0292044 A1 Nov. 18, 2010

(30) Foreign Application Priority Data

Jan. 3, 2008 (FI) .................................... 20085006

(51) Int. Cl.
*F16H 57/08* (2006.01)

(52) U.S. Cl. ...................................................... 475/348

(58) Field of Classification Search ........................ None
See application file for complete search history.

(56) References Cited

U.S. PATENT DOCUMENTS 3,293,948 A * 12/1966 Jarchow et al. ............... 475/347
3,381,548 A * 5/1968 Wolkenstein ................. 475/338
4,280,376 A * 7/1981 Rosen ........................... 475/342
5,102,379 A * 4/1992 Pagluica et al. ............... 475/331
6,964,155 B2 * 11/2005 McCune et al. ............. 60/226.1
6,994,651 B2 * 2/2006 Fox et al. ....................... 475/335
8,020,665 B2 * 9/2011 Sheridan et al. ............. 184/6.12
8,075,442 B2 * 12/2011 Ciszak et al. ................. 475/331
2005/0752211 4/2005 Fox
2012/0028755 A1 * 2/2012 Erno et al. .................... 475/331

FOREIGN PATENT DOCUMENTS

DE 102004023151 A1 12/2005
EP 0054280 A1 6/1982
EP 1435475 A2 7/2004
EP 1559928 A2 8/2005
GB 1275890 A 5/1972
GB 2413836 A 11/2005
JP 58203251 A 11/1983
WO 2005038296 A1 4/2005
WO 2006053940 A1 5/2006
WO 2007016336 A2 2/2007

OTHER PUBLICATIONS

Germanischer Lloyd, Guideline for the Certification of Wind Turbines, Edition 2003.
International Search Authority (ISA/FI); International Search Report mailed May 4, 2009 for International Application PCT/FI2009/050001; 3 pages.

* cited by examiner

*Primary Examiner* — Dirk Wright
(74) *Attorney, Agent, or Firm* — Beem Patent Law Firm

(57) ABSTRACT

The invention relates to an arrangement and a corresponding planetary gear for increasing the rotation speed including a sun wheel (12), a gear rim (10), a planet gear (14), a power input shaft (46), and a planet carrier. A construction (40) allowing flexing is placed between the support length (f) of the first fastening end (62) of the shaft (20) of the planet wheel (18) and the closest bearing for dynamically adapting the mesh geometry.

14 Claims, 4 Drawing Sheets

ARRANGEMENT IN A PLANETARY GEARING AND A PLANETARY GEAR

CROSS-REFERENCE TO RELATED APPLICATIONS

This application is a U.S. national stage application of PCT application PCT/FI2009/050001, filed Jan. 2, 2009, and claims the benefit of priority from Finnish patent application 20085006, filed Jan. 3, 2008.

BACKGROUND OF THE INVENTION

The invention relates to an arrangement in a planetary gearing where the arrangement includes:

- A planet gear including at least three planet wheels each of which has an inner race supported by at least one bearing and further a shaft supporting this bearing,
- A planet carrier including a first flange connected to an input shaft and a second flange on the opposite side, and each planet wheel shaft has

- A first end non-rotatably adapted to said first flange over a first support length,
- A center area thicker than the first end for supporting the bearing,
- A second end non-rotatably adapted to said second flange over a second support length, and the arrangement further includes a construction allowing flexing in each shaft for dynamically adapting the mesh geometry of several planet wheels to the elasticity of the construction. The invention also relates to a planetary gear driving the arrangement.

The most essential parts of the planetary gear are a sun wheel, a gear rim, and a planet gear between these. The gear rim also refers to a gear rim assembly that is composed of components connected to each other. The planet gear including at least three planet wheels is concentric with the sun wheel and the gear rim. The planet wheels are mounted with bearings to a planet carrier, which includes a first flange and a second flange tied to each other. The power input shaft is connected to the planet carrier, more precisely to its first flange, i.e. it carries the maximum torque. The sun wheel or the gear rim can be locked, in which case two of the others, the sun wheel, gear rim or carrier, rotate about the center axis of the sun wheel.

Each planet wheel has a shaft that is firmly tied to the carrier by both of its ends. The planet wheel is adapted to rotate about the shaft by means of at least one bearing, usually with two bearings.

The shaft flexes relative to the construction allowing flexing which is located in connection with the first end for dynamically adapting the mesh geometry. In this publication the term 'dynamic adaptation' is used to refer to that the load of the planet wheels is balanced regardless of various manufacturing inaccuracies and shaft deformations due to the load. When a flexible or an elastic shaft adapts the mesh geometry dynamically, larger deformations than before can be allowed for the carrier. In other words, the shaft is used to compensate misalignments caused by the torsion of the carrier.

Publication WO 2006/053940 discloses a planetary gear of a wind power plant. In such planetary gears, setting has been generally improved by correcting the tooth profile. The tooth profile can be corrected with helix angle modification, crowning and/or end relief. However, a problem with the tooth profile correction is that it must be accurately dimensioned to a certain relatively narrow output range. In a wind power plant, the planetary gear should operate in a wide output range. However, this cannot be achieved by correcting the tooth profile.

In turn, patent application WO 2005/038296 discloses equipment in which the planet wheel shaft is dimensioned to deflect. A deflecting shaft can make the planet wheels set better in the planetary gear. Setting is necessary since planetary gear components always have slight inaccuracy.

The solutions proposed in patent publications WO 2007/016336 and GB 2413836 for the dynamic adaptation of the mesh geometry are also based on the deflection of a long shaft. With these, the mesh geometry of several planet wheels sets in place for each planet wheel when their shafts flex suitably correcting the effect of manufacturing inaccuracy.

Publication DE 102004023151 proposes a planetary gear that has a flange in connection with the shaft. This construction helps compensate manufacturing defects, for example. However, these solutions do not provide a remarkable benefit from relieving of the carrier since the combined size of the shaft and the flange increases remarkably. In a version equipped with a flange, a great part of the benefit achieved by relieving the carrier is thus lost.

Closest to the invention are the solutions proposed in patent publications EP 1435475 and U.S. Pat. No. 5,102,379 where a double-flanged carrier is used to support the planet wheel shafts at both ends. In these, the deflecting length of the shaft is formed within the thicker center part as a deep axial cavity has been machined in the center part. The EP publication discloses additionally the asymmetric construction of the shaft, which is necessary for providing a perfect dynamic adaptation. In the speed-reducing planetary gear of the EP publication, torque is conveyed to the sun wheel whereby the torque acting on the first flange of the carrier is proportionally much lower than in a planetary gearing that increases the rotation speed. The notch effect of the circumferential cavity is not significant due to the lowness of the torque.

The above known solutions are suitable mainly to planetary gearings that reduce rotation speed. Known solutions are difficult to use in heavy wind turbine applications in which the torque is today in a range of 1-10 millions Nm. In jet engine motors the maximum torque is only a fraction of this since the rotation speed of a turbine is 3000-6000 RPM and in a speed-reducing planetary gearing the force is conveyed to the sun wheel whereby the carrier's torque remains naturally low. Planetary gears of wind turbines are today very large and they are used to transmit high output powers from a slowly rotating rotor. Thus planetary gears used in wind turbines have many special features. One significant special feature is that they are used to increase the rotation speed while planetary gears are typically used elsewhere to reduce the rotation speed. In addition, the size of the planetary gear is very essential because it is desired to limit the mass lifted up to a mast. However, it is difficult to reduce the size of a high-output planetary gear because all the methods of the conventional machine design have already been used.

As regards the size reduction of a planetary gear, it would be advantageous to increase the number of planet wheels but, according to prior art, it is necessary to increase dimensional loads when the number of planet wheels goes up from three, due to the assumed uneven load (Germanischer Lloyd, Guideline for the Certification of Wind Turbines, Edition 2003). As dimensional loads increase, a major part of the benefits achieved while increasing the number of planet wheels up from three with conventional methods is typically lost.

BRIEF SUMMARY OF THE INVENTION

The object of the invention is to provide an arrangement in a planetary gear and a driving planetary gear for the arrangement which can be manufactured lighter in weight than before in high-torque wind turbines, particularly in a range of 2-10 millions Nm (Nm=newton meter). The characteristic features of the arrangement according to this invention are set forth in the appended claim 1.

In an embodiment, the first flange includes a chamfer on the inside, which covers essentially said construction allowing flexing. Then the first flange can otherwise have a thickness that is equal to the dimension of the first end of the shaft so that there is no need to compromise over the stiffness of the first flange, and a compact construction is achieved.

In an embodiment, the first end of the shaft includes an axial bore extending to the center area and having a diameter of 25-60%, advantageously 35-45% of the diameter of the first end of the shaft.

In an embodiment, a second construction allowing flexing, the flexibility of which is substantially smaller than at the first end, is included in the vicinity of the second end of the shaft. Consequently, sufficient flexibility at this end is achieved by thinning the shaft over a short length. When the shaft flexes in the vicinity of the second end as well, tolerance errors can be compensated. Tolerance errors include, for example, pitch error, eccentricity, and misalignment of the shaft or the toothing. A remarkable difference of the construction according to the invention compared to known solutions is related to the fact that a major part of flexibility (typically 15-50%) comes from the shear strain and not merely from the deflection, unlike in known solutions.

When the carrier is relieved for reducing the mass of the planetary gearing, the carrier flanges can turn relative to each other. Then the shaft is subjected to a shearing stress, the detrimental effects of which can be eliminated when the shaft flexes more in the vicinity of its first end.

The center area of the shaft carries one or two bearings as desired and deformations take place in the flexing intervals. The effects from the torsion between the carrier flanges on the mesh geometry are dynamically corrected particularly in the first flexing interval. Tolerance errors are corrected in both flexing intervals. When mere tolerance errors are corrected, flexibility values would be, in the course of time, equal on average in both flexing intervals.

A modification can be made from the above described embodiment according to claim 10 where the bearings are placed in both flanges carrying rotatably the shaft ends, and the shaft carries the planet wheel fixedly. The shaft flexes in exactly the same way as in the above described arrangement.

BRIEF DESCRIPTION OF THE FIGURES

The invention is described below in detail by making reference to the enclosed drawings, which illustrate some of the embodiments of the invention, in which.

DETAILED DESCRIPTION OF THE INVENTION

Figure 1:
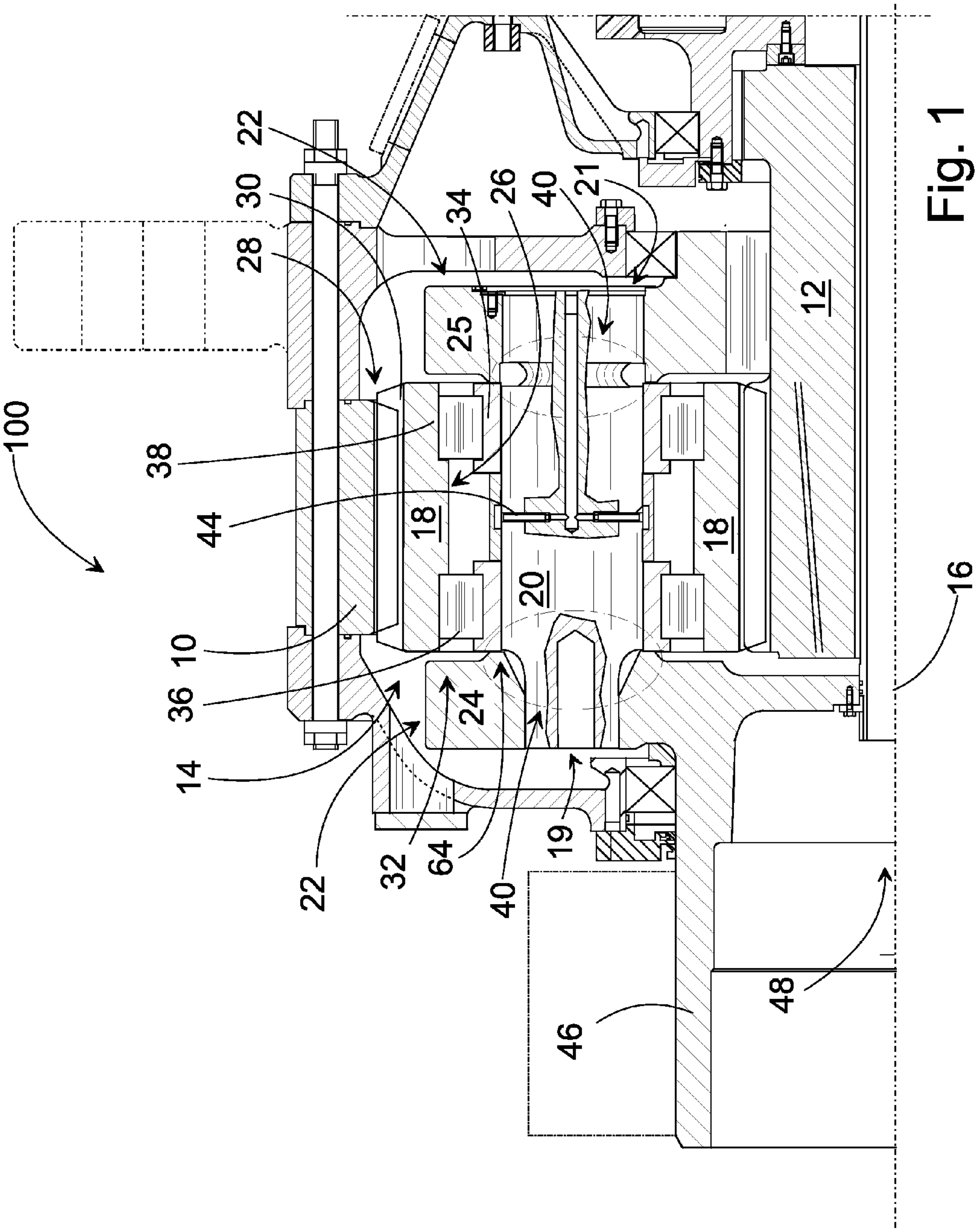
FIG. 1 is a cross-section of the upper part of the shaft of the planetary gearing according to the invention.

The planetary gear 100 according to the invention shown in FIG. 1 includes as the most essential parts a sun wheel 12, a gear rim 10, and a planet gear 14. The sun wheel 12, the gear rim 10 and the planet gear 14 all have the same center axis 16. In other words, the gear rim 10 is located around the center axis 16 of the sun wheel. The planet gear 14 is located between the sun wheel 12 and the gear rim 10 touching both, and it is functionally connected, i.e. meshes with the toothing of the internal gear and the toothing of the sun wheel. The number of planet wheels in the planet gear is at least three. The planet gear 14 has the same center axis 16 as the sun wheel 12. Each planet wheel 18, in turn, has a shaft 20 of its own about which the planet wheel rotates. The planet wheel has an inner race 26 and an outer race 28. Of these, the outer race 28 has the toothing 30 of the planet wheel 18. The carrier 22 of the planet gear 14 includes a first flange 24 and a second flange 25 tied to each other as rigidly as possible. An input shaft 46 is fastened to the first flange 24.

Figure 2:
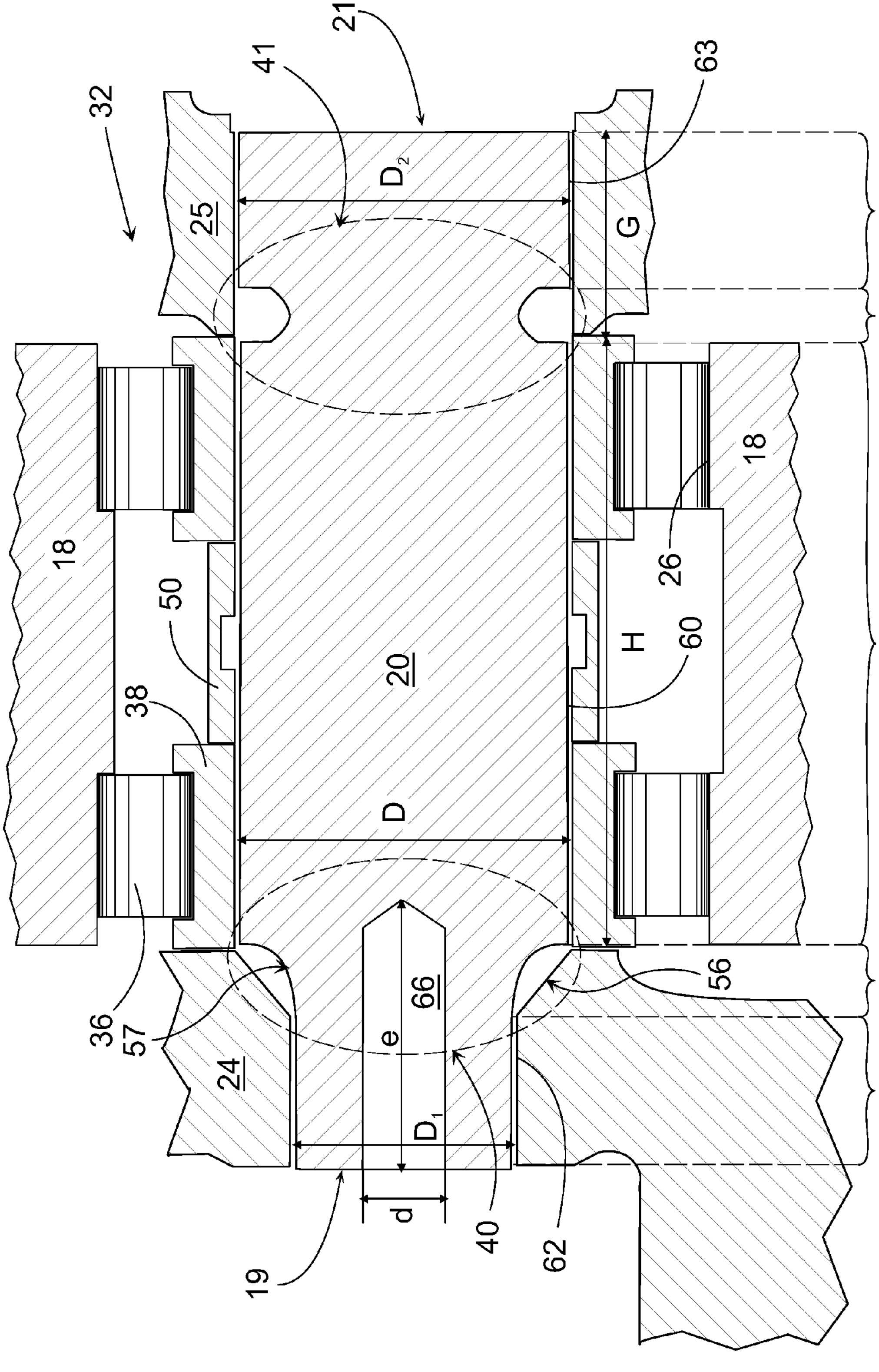
FIG. 2 shows the shaft of the planet wheel according to the invention, fastened to a carrier, as well as its dimensions.

Each planet wheel 18 has a shaft 20 having a first end 19 and a second end 21. The planet wheel 18 is adapted to rotate about the shaft 20. The first end 19 of the shaft 20 of the planet wheel 18 is fastened to the first flange 24 of the carrier 22 in the first fastening end 62 of the shaft 20 over a support length f, and correspondingly, the second end 21 (diameter $D_2$) of the shaft 20 of the planet wheel 18 is fastened to the second flange 25 of the carrier 22 in the second fastening end 63 over a support length g (FIG. 2). In addition, this end is locked to the flange 25 with specific elements, such as a lock pin, to be non-rotatable (not shown).

The planetary gear 100 includes at least one bearing 32 between the inner race 26 of each planet wheel and the shaft 20 of the planet wheel 18, fixedly supported to the shaft 20 of the planet wheel 18. Each bearing 32 has an inner ring 34, roller elements 36, and an outer ring 38. In addition, a construction 40 allowing flexing is located between the first fastening end 62 of the shaft 20 of the planet wheel 18 and the closest bearing 32 for dynamically adapting the mesh geometry (FIG. 2). Thus the carrier can be manufactured lighter in weight than before since the torsion taking place between the carrier flanges can be compensated with the construction allowing flexing. On the other hand, when relieving the carrier, it must be possible to handle the deformations generating due to the torsion between the carrier flanges while maintaining the mesh geometry. The carrier flanges are allowed to turn relative to each other to a greater extent than before since the planet wheel shaft changes its form compensating torsion that takes place between the flanges. Thus the mesh geometry is dynamically adjusted. The deflection of the construction allowing flexing can be as much as over one percentage of the shaft thickness.

In the planetary gear according to the invention, the planet wheel shaft is used to compensate torsion taking place in the carrier. An example of relieving the carrier may be a gear with a rated output of 1500 kW, the carrier of which has traditionally weighed well over 2000 kg. The carrier can be best relieved such that its weight remains as low as 1500-1600 kg. Thus the relief would be about 25%. It is possible that so significant carrier relief already causes excessive flexing. Therefore, it can be said that the carrier can be securely relieved probably at least by 10% with even this being a significant change in the light of traditional dimensioning. In addition, it is possible to simultaneously compensate tolerance errors, which include, for example, pitch error, eccentricity, and misalignment of the shaft or the toothing.

In connection with a one-sided carrier, such as has been proposed in patent publication WO 2005/038296, for example, using a helical toothing is challenging. However, a helical toothing is very essential as regards uniform gear operation. When the helix angle of the teeth is increased, vibration occurring in the gear can be reduced. On the other hand, the helix angle must not be too large either, since the forces acting on the bearing increase as the helix angle increases. With a flexible shaft the helix angle can be 0.5°-4°, advantageously 1°-2°. Thus loads subjected to the bearings can be set to a suitable level simultaneously with a smooth and vibrationless operation. Vibrationless operation, in turn, is essential in order that the gear operates quietly. This is important particularly in wind power plants as regards the life span of gears and reduction of environmental noise.

Compared to the prior art one-sided planetary gear, two flanges in the carrier make the construction stiffer, which enables an entity that is better controllable as regards the rest of the construction. In other words, the shaft can be better supported to a two-flanged carrier than to a one-flanged one whereby the loads subjected to the carrier are lower, and the stresses can be controlled in a better way than in a one-flanged construction. In addition, stresses are more uniformly distributed between the bearings. Two flanges enable in general a more advantageous stress distribution than a one-flanged construction.

The planetary gear 100 according to the invention shown in FIG. 1 can be used in a two-stage planetary gearing of a wind power plant as the first planetary gear. A one-stage planetary gear can also be connected directly to a generator. A blade assembly (not shown) is fastened to the input shaft 46. A hollow channel 48 through which control commands are delivered to the blade assembly is located at the center of the input shaft 46 and the sun wheel 12 for adjusting the blade angles of the blade assembly, for example. On the other hand, planetary gears can be combined in many other ways, too, to achieve a desired gear ratio for the gearing. A planetary gear refers here to a one-stage planetary gear such that can be combined as desired when assembling planetary gearings.

In the planetary gear 100 according to the invention shown in FIG. 1, the inner ring 34 of the bearing 32 and the shaft 20 of the planet wheel 18 are fastened to each other with an interference fit 64. A locking pin 44 through which lubrication oil can be led to the bearing 32 is placed between the shaft 20 of the planet wheel 18 and the bearing 32. The bearing can be a standard bearing. The material of the carrier is typically cast iron. The other parts, in turn, for example the shafts, flanges, internal gear, sun wheel and planet wheels, are typically of constructional steel.

In the planetary gear 100 shown in FIG. 1, a first construction 40 allowing flexing is included in the vicinity of the first end 19 of the shaft 20 of the planet wheel 18, and a second construction 41 allowing flexing is included in the vicinity of the second end 21, for dynamically adapting the mesh geometry. This construction is particularly useful when the planet wheels are four or more in number. More precisely, the number of planet wheels is 4-12, advantageously 4-7. In this case, even small tolerance errors cause a different load between the planet wheels. When using a shaft according to the invention with constructions 40, 41 allowing flexing in association with four or more planet wheels, the benefit becomes emphasized, since three planet wheels slightly correct tolerance errors existing in them.

In the planetary gear 100 according to the invention shown in FIG. 1, the inner race 26 of the planet wheel 18 is formed directly as the outer ring 38 of the bearing. As regards this invention, the planet wheel is stiff and inflexible as such. This embodiment is advantageous since the construction can be made more resisting when the inner race 26 is directly the outer ring 38. In addition, when there is only one component to be manufactured instead of two, tolerance errors reduce. In general, it can be stated that when the inner race is directly the outer ring, a construction more resistant and more capable of power transmission, compared to a separate construction, can be fitted to the same space.

It can also be contemplated to manufacture a special case in which the inner ring of the bearing is the shaft (not shown). This embodiment enables reducing the number of components to be manufactured. However, as regards the assembly, this embodiment has some specific challenges.

The planetary gearing according to the invention shown in FIG. 1 is so designed that the highest rated output transmitted through the planetary gear is 1-15, advantageously 3-10 megawatts. The best advantage from the invention is achieved when the power to be transmitted is over 250 kW, advantageously 500-1500 kW per planet wheel. Then the shaft of the planet wheel deflects measurably at a high load. The deflection (and together with the shear strain) is in a class of 1%. When so high output powers are transmitted through this planetary gear, remarkable flexing takes place in the carrier. Thus elasticity appears in the construction although it is designed notably stiff as such. The carrier can be relieved compared to what is known. Moreover, as the size class of the planetary gearing is this high, a significant advantage is achieved from increasing the number of planet wheels, since increasing the number of planet wheels allows transmitting the same previous output power through a planetary gear that is smaller than before. As mentioned above, when increasing the number of planet wheels from three, some of the tolerance for dimensional errors of the construction is lost. Reducing the size of a planetary gearing is based on two things, as described above. Firstly, when flexing is allowed for the carrier, the carrier can be relieved. Secondly, when the shaft compensates tolerance errors, the number of planet wheels can be increased.

FIG. 2 shows a shaft 20 according to the invention for a planet wheel 18 fastened in both of its ends to a carrier 22, more precisely to flanges 24 and 25. The shaft 20 of the planet wheel 18 includes a center area 60 (length h), a first fastening end 62 (length h), a second fastening end 63 (length g), and flexing intervals a and b on both sides of the center area 60. The flexing intervals a and b have roundings 57 that are as gentle as allowed by the structural dimensioning leaving however a sufficient deformation length in the flexing interval a.

The center area 60 supports bearings 32, which are here two in number. A spacer ring 50 is placed between the inner rings 34 of the bearings. The shaft 20 of the planet wheel 18 is supported to the first flange 24 in the first fastening end 62 and to the second flange 25 in the second fastening end 63.

The flexing interval a exists between the first fastening end 62 and the center area 60 for allowing deformations of the shaft 20. In other words, shaft deformations take place mainly within this flexing interval a. When flexing takes place outside the center area, stresses directed to the bearing can be minimized.

FIG. 2 shows a planetary gear according to the invention in which the stiffness $EI_1$ of the flexing interval a is less than 60%, advantageously less than 50% of the stiffness $EI_2$ of the center area 60. As the stiffness EI changes, the elastic modulus typically remains the same and the momentum of inertia I changes. Stiffness of the flexing interval means the average stiffness of the flexing interval. Correspondingly, stiffness of the center area means the average stiffness of the center area. The profiles in the shaft in the flexing interval and the center area create different momentums of inertia and further different stiffnesses for the flexing interval and the center area.

The second flexing interval b is located between the second fastening end 63 and the center area 60. The first flexing interval a and the second flexing interval b function together forming a shaft which permits dimensional errors and deformations as designed. The stiffness of the second flexing interval is less than 75%, advantageously less than 60% of the stiffness of the center area. The stiffness of the second flexing interval is advantageously higher than the stiffness of the first flexing interval. In the application of FIG. 2, the length of the first flexing interval is 1.1-2, advantageously 1.6 times the second flexing interval b. This construction is advantageous for use since both flexing intervals compensate dimensional errors. However, torsion occurring between the carrier flanges is compensated particularly by the flexing interval a. For this reason, the flexing interval a is longer than the flexing interval b. Both flexing intervals thus allow correction of tolerance errors. The first flexing interval compensates deflection between the carrier flanges while being longer than the second flexing interval.

In FIG. 2, a chamfer 56 has been made in the flexing interval a in the first flange 24 of the carrier 22 enabling the shaft flexing without the shaft touching the carrier in the flexing interval.

FIG. 2 illustrates dimensioning of a planet wheel shaft. The center area 60 of the shaft 20 has a length h. The bearing assembly 32 has a width H. Furthermore, the length h of the center area 60 is 85-100%, advantageously 90-99% of the width H of the bearing 32. Thus both bearings 36 are firmly supported by their inner surfaces with the shaft 20. The length h of the center area 60 is 300-900 mm, advantageously 400-700 mm.

The first fastening end 62 has a support length f and the first flange 24 has a thickness F. The support length f of the first fastening end 62 is 50-90%, advantageously 60-80% of the thickness F of the first flange 24 in a compact construction. The thickness F of the first flange 24 is the distance between the shaft end 19 and the bearing 32. In turn, the second fastening end 63 of the shaft has a support length g and the second flange 25 has a thickness G. Furthermore, the support length g of the second fastening end 63 is 75-95%, advantageously 75-85% of the thickness G of the second flange 25. The thickness G of the second flange 25 is the distance between the other shaft end 21 and the bearing 32.

In the entity formed by the shaft 20 and the carrier 22 in FIG. 2, the support length g of the second fastening end 63 covers the greatest part of the thickness G of the second flange 25 similarly as the support length f of the first fastening end 62 covers the greatest part of the thickness F of the first flange 24. Thus the shaft is kept tightly attached to the flanges 24 and 25 by means of interference fits.

The first end 19 of the planet wheel 18 shaft 20 includes a flexing hole 66 for increasing flexing of the first end of the shaft. Here the hole should be widely understood comprising different types of openings. An axial bore 66 extends from the end to the center area. In turn, the diameter d of the flexing hole 66 is 30-70 mm.

With these dimensions the flexing hole clearly differs from holes that have a notably smaller diameter. A hole designed for supplying a lubricant does not have a similar effect on the shaft stiffness as a flexing hole. As to the length, in turn, lubrication holes extend long to the shaft. A lubricant can be led through lubrication holes but flexing holes are advantageously enclosed.

In FIG. 2 the depth e of the flexing hole 66 is 80-150%, advantageously 100-130% of the thickness F of the first flange 24. Thus flexing can be made to take place as desired in the first flexing interval a. On the other hand, the depth e of the flexing hole 66 is 100-300%, advantageously 105-200% of the support length f of the first fastening end 62.

The diameter D of the shaft 20 is 100-240 mm, advantageously 130-200 mm. The diameter $D_1$ of the first end is here 67% (advantageously 55-75%) of the diameter D of the center part 60. The diameter d of the flexing hole 66, in turn, is 20-50%, advantageously 30-40% of the shaft diameter D. Thus the flexing hole has a significant effect on the shaft flexing. A flexing hole has a particular importance as it adds the shear strain and the deflection caused by that. The flexibility of the carrier naturally determines the required flexing in each shaft.

Figure 3:
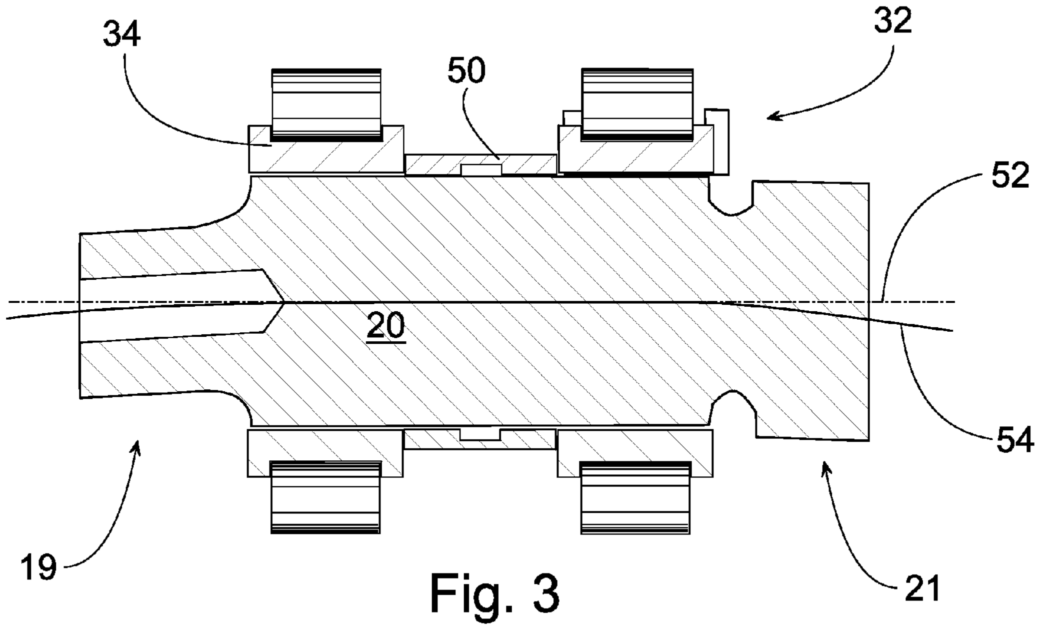
FIG. 3 shows the shaft of the planet wheel according to the invention in a loading condition.

FIG. 3 shows an elastic shaft 20 according to the invention for a planet wheel, in a loaded state. Thus forces acting on the elastic shaft have made it flex. The geometric center axis 54 of the shaft 20 has deflected. Then the center axis 52 of the bearing 32 is divergent from the center axis 54 of the shaft 20 at the ends 19, 21 of the shaft 20. The condition shown in the figure is exaggerated in order to show the operating principle of the shaft. When the shaft compensates flexing between the carrier flanges, the bearing remains substantially in the same position as in an unloaded state in which carrier flexing has not occurred. The condition shown in the figure is only one loading condition in which the shaft deflects at both of its ends due to tolerance errors and additionally at its first end for compensating torsion of the carrier flanges relative to each other.

Figure 4:
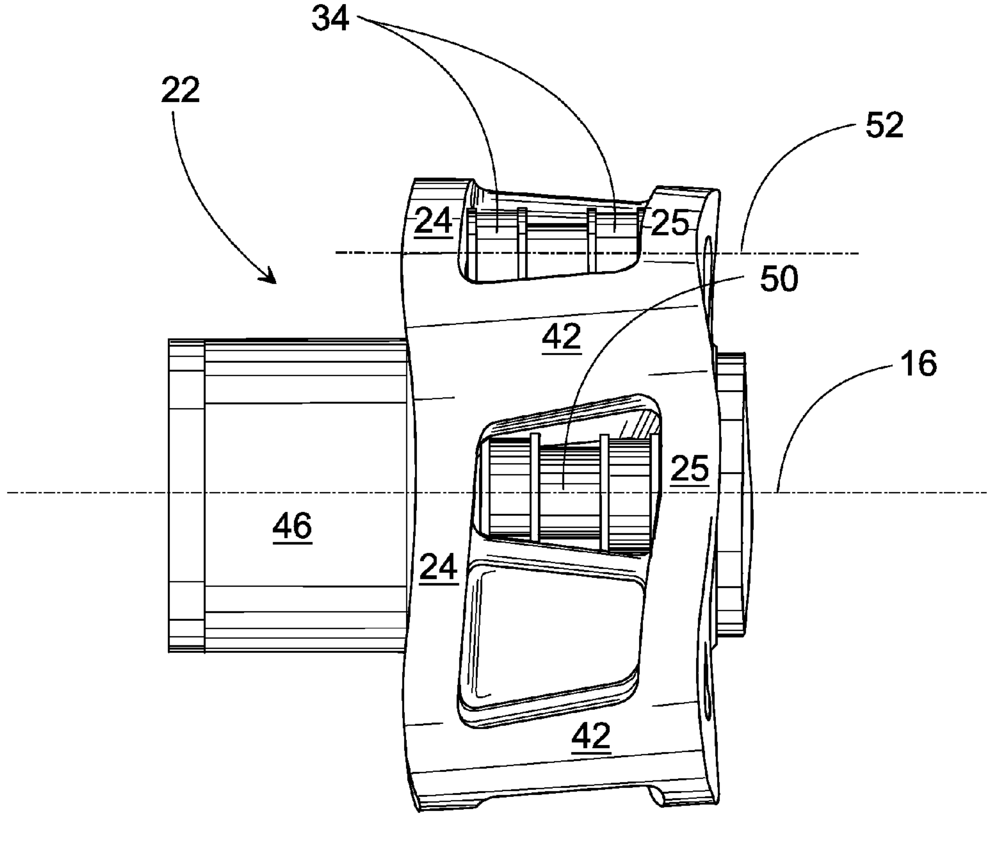
FIG. 4 shows the carrier turned with a pin according to the invention placed between the carrier flanges.

FIG. 4 shows a carrier 22 used in a planetary gear according to the invention with the first flange 24 and the second flange 25 thereof having turned relative to each other. In addition to correcting tolerance errors, the invention enables compensating misalignments caused by the carrier torsion. The necks 42 between the flanges 24, 25 have also turned. The torsion of the flanges 24, 25 and the necks 42 has caused distortion of the flanges 24, 25. Torsion and distortion shown in the figure are exaggerated in order that the figure could show better how the elastic construction of a shaft according to the invention corrects the effects of torsion and distortion. The center axes 52 of the inner rings 34 of the bearing are parallel with the center axis 16 of the carrier 22 and at the same time of the sun wheel. The center axis 52 of the inner rings 34 is theoretical and in practice the shaft 20 in the unloaded state (FIG. 2) corresponds to it. The inner rings 34 of the bearings are thus still in the loaded state substantially parallel with the center axis 16 of the carrier and further of the sun wheel in the same way as in the unloaded state.

Although the shaft deflects in the vicinity of the ends (center line 54), the center point of the shaft forms the center axis 52 for the inner rings 34 of the bearings and at the same time for the planet wheels 18 (FIG. 5). The center axis 52 of the inner rings 34 of the bearing is substantially parallel with the center axis 16 of the carrier 22 even in the loaded state. Thus the shaft distortion due to the torsion of the carrier does not cause remarkable misalignments in the planet wheels. The shaft 20 of the planet wheel (FIG. 1) may also be initially slightly divergent from the center axis 16 of the sun wheel due to the accuracy of manufacture. The shaft according to the invention allows turning of the bearing inner rings and thus of the planet wheels due to the effect of forces. As a final benefit, with the flexing interval according to the invention, an elastic shaft achieves an optimum mesh behavior whereby loads are better distributed between the planet wheels. In addition, loads are distributed uniformly in each planet wheel and mesh even when using a novel carrier which is lighter in weight than before.

Figure 5A:
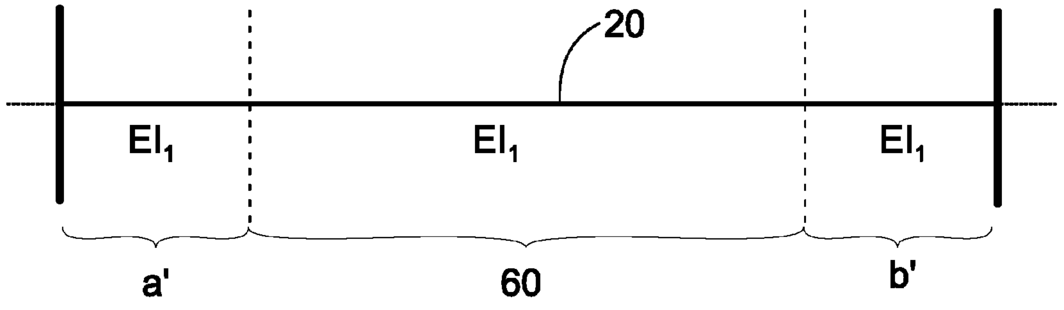
FIG. 5*a* is a basic view of an unloaded shaft the stiffness of which is equal over the entire distance.

FIG. 5*a* shows the principle of the shaft 20 the stiffness $EI_1$ of which is the same over the entire distance, i.e. the dimension of the shaft 20. The shaft 20 is in an unloaded state. When the shaft is in an unloaded state, forces are not directed to the shaft due to the torsion of the carrier or the planet wheel mesh.

Figure 5B:
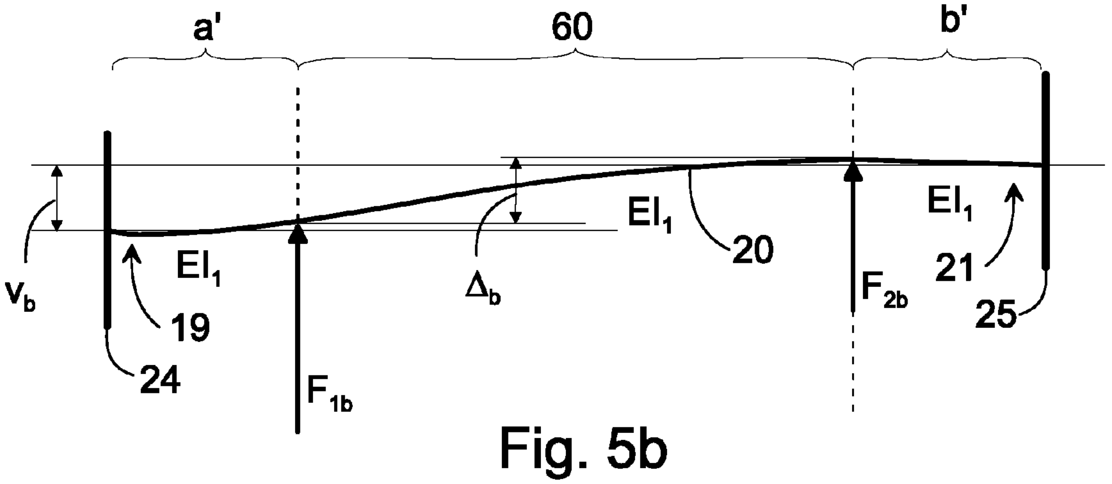
FIG. 5*b* is a basic view of a loaded shaft the stiffness of which is equal over the entire distance.

FIG. 5*b* shows the principle of the shaft 20 according to FIG. 7*a* in a loading condition. The shaft 20 is fastened to a first flange 24 by its first end 19 and to a second flange 25 by its second end 21. The stiffness $EI_1$ of the shaft 20 is the same over the entire shaft dimension. As a consequence of a distortion $v_b$ due to the relative movement of the flanges 24 and 25, i.e. the torsion of the carrier, the shaft deforms. Then forces $F_{1b}$ and $F_{2b}$ are conveyed to the shaft from the bearing. Subscripts b and c refer to FIGS. 7*b* and 7*c*. An error $\Delta_b$ occurs in the shaft between the bearing points or forces $F_{1b}$ and $F_{2b}$. Due to the deformation, problems appear in the mesh behavior of the planet wheel connected to the shaft. The force $F_{1b}$ directed to the shaft 20 from the bearing is notably higher than another force $F_{2b}$ directed to the shaft 20 from the bearing. The forces are remarkably unbalanced.

Figure 5C:
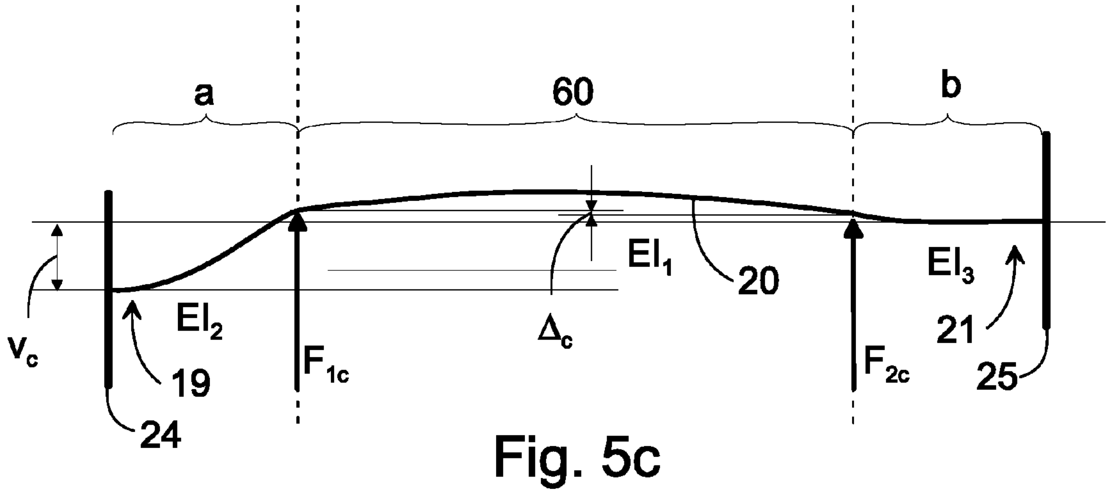
FIG. 5*c* is a basic view of a loaded shaft the stiffness of which varies in the longitudinal direction of the shaft.

In FIG. 5*b* the shaft 20 is divided into areas a', 60, and b'. In FIG. 5*c*, in turn, the shaft is divided into areas a, 60, and b. When comparing FIGS. 5*b* and 5*c*, it can be noted that the area a corresponds to area a' in the longitudinal direction of the shaft and area b corresponds to area b'. However, area a' is not an actual flexing area since the stiffness of area a' is the same as the stiffness of the center area 60.

FIG. 5*c* shows the principle of a loading condition of a shaft 20 according to the invention. The shaft is divided into three areas a, 60, and b, having stiffnesses $EI_2$, $EI_1$ and $EI_3$, respectively. The shaft 20 is supported to a first flange 24 by its first end 19 and to a second flange 25 by its second end 21. The stiffness $EI_2$ of the flexing interval a between the first flange 24 and the center area 60 is less than 60%, advantageously less than 50% of the stiffness $EI_1$ of the center area 60. Thus the flexing area flexes as desired as a consequence of the distortion $v_c$ which is due to the torsion of the carrier flanges. The shaft has an error $\Delta_c$ between the bearing points, i.e. an error $\Delta_c$ is caused between forces $F_{1c}$ and $F_{2c}$. In other words, the error $\Delta_c$ is caused in the center area 60 which is located between forces $F_{1c}$ and $F_{2c}$ and fixedly supported to the bearing. Then forces $F_{1c}$ and $F_{2c}$ are conveyed to the shaft from the bearing located around the shaft. The distortion $\Delta_c$ caused to a shaft with a flexing interval is smaller than the distortion $\Delta_b$ caused to a shaft without a flexing interval. In other words, a shaft with a flexing interval does not tend to turn the planet wheel to a wrong position as intensively as a shaft without a flexing interval. The stiffness of a shaft without a flexing interval is the same over the entire shaft dimension.

When comparing FIGS. 5*b* and 5*c*, it can be seen that in both figures the carrier flanges have moved relative to each other for a distance v, more precisely for a distance $v_b$ in FIG. 5*b* and for a distance $v_c$ in FIG. 6*b*. Then the shaft must accommodate to the deformation v of the carrier. When the stiffness $EI_2$ of the flexing area a of the shaft 20 is less than 60%, advantageously less than 50% of the stiffness $EI_1$ of the center area 60, the error $\Delta_c$ can be made close to zero in a wide loading range. In other words, the error $\Delta_c$ is notably smaller than the error $\Delta_b$.

When the stiffness of the shafts decreases, the shafts prevent the movement between the carrier flanges to a smaller extent than before. Then the carrier may deform slightly more in the case of FIG. 5*c* than in the case of FIG. 5*b*. In other words $V_c$ can be slightly higher than $V_b$. However, increased carrier torsion does not cause problems when the flexing areas a and b in the shaft compensate the carrier torsion. Then, regardless of increased carrier torsion, the error between the bearing points reduces.

The flexing areas in the shaft compensate the carrier torsion in such a way that the carrier can even be relieved and the error between the bearing points is still smaller than in the original construction.

In the shaft 20 shown in FIG. 5*c*, there is a second flexing interval b between the second end 21 and the center area 60. The stiffness $EI_3$ of the second flexing interval b is less than 75%, advantageously less than 60% of the stiffness $EI_1$ of the center area 60. This further enables reducing the error V in a loading range wider than before. Forming the shaft is simpler than manufacturing the shaft of new materials with different elastic moduli. Therefore the shaft is formed in such a way that as the stiffness changes, the momentum of inertia changes while the elastic modulus remains the same.

In the shaft shown in FIG. 5*c*, the stiffness $EI_2$ of the first flexing interval a is less than 0.9, advantageously less than 0.7 times the stiffness $EI_3$ of the second flexing interval b.

To achieve flexing shown in FIG. 5*c*, the first fastening end 62 of the planet wheel shaft 20 includes a flexing hole 66 shown in FIG. 4. The flexing hole enables calculating the shaft stiffness in the flexing area compared to the center area. If the stiffness were reduced correspondingly with the mere external shaft design, the shaft should be made notably thinner in the flexing area.

To achieve flexing shown in FIG. 5*c*, the first fastening end 62 of the shaft 20 has a support length f and the flexing hole 66 has a depth e, as shown in FIG. 2. The depth of the flexing hole 66 is 100-300%, advantageously 105-200% of the thickness f of the first fastening end 24.

To achieve flexing shown in FIG. 5*c*, the first end 19 of the shaft 20 has a diameter $D_1$, the center part 60 has a diameter D, and the flexing hole 66 has a diameter d, as shown in FIG. 4. The diameter of the flexing hole is 20-50%, advantageously 30-40% of the diameter D of the shaft 20. The diameter $D_1$ of the first end is 67% (advantageously 55-75%) of the diameter D of the center part 60.

When increasing the number of planet wheels from three, movement is also caused for correcting dimensional errors. This aspect could be illustrated in a corresponding manner as the distortion caused by the torsion of the carrier, i.e. the movement between the flanges, has been illustrated in FIGS. 5*b* and 5*c*.

The invention claimed is:

1. An arrangement in a planetary gearing where the arrangement includes:

a planet gear including at least three planet wheels each of the planet wheels having an inner race, at least one bearing supporting it, and further a shaft supporting this bearing, a carrier for the planet gear including a first flange connected to an input shaft and a second flange on the opposite side, and each shaft of the planet wheel has a first end with diameter $D_1$ non-rotatably adapted to said first flange over a first support length, a center area thicker than the first end for supporting the bearing, a second end non-rotatably adapted to said second flange over a second support length (g), and the arrangement further includes a construction allowing flexing in each shaft for dynamically adapting the mesh geometry of several planet wheels to the elasticity of the construction, characterized in that the construction allowing flexing of the shaft is a flexing interval (a) having the diameter $D_1$ of the said first end and a gentle rounding protruding from the diameter $D_1$ of the said first end towards the diameter D of the thicker center area, and the said flexing interval (a) is between the first support length (f) and the thicker center area and particularly outside the center area.

2. An arrangement according to claim 1, characterized in that the diameter $D_1$ of the first end of the shaft is 55-75% of the diameter D of the center part.

3. An arrangement according to claim 1, characterized in that the first end of the shaft includes an axial bore extending to the center area the diameter (d) of which is 25-60%, advantageously 35-45% of the diameter $D_1$ of the first end of the shaft.

4. An arrangement according to claim 1, characterized in that the first flange includes a chamfer on the inside which covers substantially the construction allowing flexing.

5. An arrangement according to claim 1, characterized in that a second construction, a flexing interval (b), allowing flexing is included in the vicinity of the second end of the shaft of the planet wheel.

6. An arrangement according to claim 5, characterized in that the length of the first flexing interval (a) is at least 1.1 times, advantageously 1.6 times the second flexing interval (b).

7. An arrangement according to claim 1, characterized in that the average stiffness ($EI_2$) of the flexing interval (a) is less than 60%, advantageously less than 50% of the stiffness ($EI_2$) of the center area.

8. An arrangement according to claim 1, characterized in that the support length (f) of the first fastening end in the first flange supporting it is 50-90%, advantageously 60-80% of the thickness (F) of said flange.

9. An arrangement in a planetary gearing where the arrangement includes:

a planet gear including at least three planet wheels where each planet wheel has an inner race and a shaft supporting it and having a first end and a second end for supporting the shaft, a planet carrier including a first flange connected to an input shaft and a second flange on the opposite side, and said ends of each shaft are supported by bearings in each flange and each planet wheel shaft has a first end with diameter $D_1$ adapted to said bearing of the first flange over a first support length, a center area that is thicker than the first end for supporting the planet wheel, a second end adapted to said second flange over a second support length, and the arrangement further includes a construction allowing flexing in each shaft for dynamically adapting the mesh geometry of several planet wheels to the elasticity of the construction, characterized in that the construction allowing flexing of the shaft is a flexing interval having the diameter $D_1$ of the said first end and a gentle rounding protruding from the diameter $D_1$ of the said first end towards the diameter D of the thicker center area, and the said flexing interval is between the first support length and the thicker center area and particularly outside the center area.

10. A planetary gear for increasing the rotation speed where the planetary gear includes:

a sun wheel having a center axis, a gear rim located around the sun wheel, and the gear rim has the same center axis as the sun wheel, a planet gear including at least three planet wheels with the planet wheel assembly being located between the sun wheel and the gear rim touching both and being concentric with the sun wheel and the gear rim, and with each planet wheel having an inner race, a power input shaft, a planet gear carrier including a first flange on the side of the input shaft and a second flange on the opposite side, characterized in that the planetary gearing includes an arrangement according to claim 1.

11. A planetary gear according to claim 10, characterized in that the rated output of the planetary gearing is 1-5 MW.

12. A planetary gear according to claim 10, characterized in that the dimensional moment entering the planetary gearing is in the range of 2-10 millions Nm.

13. A planetary gear according to claim 10, characterized in that the number of planet wheels is 4-12, advantageously 4-7.

14. A planetary gear for increasing the rotation speed where the planetary gear includes:

a sun wheel having a center axis, a gear rim (10) located around the sun wheel, and the gear rim has the same center axis as the sun wheel, a planet gear including at least three planet wheels with the planet wheel assembly being located between the sun wheel and the gear rim touching both and being concentric with the sun wheel and the gear rim, and with each planet wheel having an inner race, a power input shaft, a planet gear carrier including a first flange on the side of the input shaft and a second flange on the opposite side, characterized in that the planetary gearing includes an arrangement according to claim 9.

* * * * *